US012695045B2

(12) United States Patent
Hopf et al.

(10) Patent No.: US 12,695,045 B2
(45) Date of Patent: Jul. 28, 2026

(54) ION BEAM EXTRACTION APPARATUS AND METHOD FOR CREATING AN ION BEAM

(71) Applicant: Max-Planck-Gesellschaft zur Foerderung der Wissenschaften e. V., Munich (DE)

(72) Inventors: Christian Hopf, Garching (DE); Bernd Heinemann, Garching (DE); Markus Froeschle, Garching (DE); Moritz Eckerskorn, Garching (DE); Niek Den Harder, Garching (DE)

(73) Assignee: Max-Planck-Gesellschaft zur Foerderung der Wissenschaften e. V., Munich (DE)

( * ) Notice: Subject to any disclaimer, the term of this patent is extended or adjusted under 35 U.S.C. 154(b) by 517 days.

(21) Appl. No.: 18/010,669

(22) PCT Filed: Jun. 22, 2020

(86) PCT No.: PCT/EP2020/067321

§ 371 (c)(1),
(2) Date: Dec. 15, 2022

(87) PCT Pub. No.: WO2021/259446

PCT Pub. Date: Dec. 30, 2021

(65) Prior Publication Data

US 2023/0230793 A1 Jul. 20, 2023

(51) Int. Cl.

*H01J 27/02* (2006.01)
*G21B 1/11* (2006.01)
*H05H 3/06* (2006.01)

(52) U.S. Cl.

CPC .............. *H01J 27/024* (2013.01); *G21B 1/11* (2013.01); *H05H 3/06* (2013.01)

(58) Field of Classification Search

None

See application file for complete search history.

(56) References Cited

U.S. PATENT DOCUMENTS 5,920,076 A * 7/1999 Burgin .................... H01J 37/15 315/111.81
6,559,454 B1 * 5/2003 Murrell ................. H01J 27/022 250/423 R (Continued)

FOREIGN PATENT DOCUMENTS

CN 110993474 A * 4/2020 .......... H01J 37/1471
EP 0782763 A1 7/1997

(Continued)

OTHER PUBLICATIONS https://www.rg-group.com/air-motor-vs-electrical-motor-which-one-should-you-choose/?srsltid=AfmBOort9Rm3fOS6U8-rDoPH3265AWC46VHLRo3KhGa5vF5vZdHrAsFk (Jan. 25, 2019) (Year: 2019).*

(Continued)

*Primary Examiner* — James Choi
(74) *Attorney, Agent, or Firm* — Caesar Rivise, PC

(57) ABSTRACT

An ion beam extraction apparatus (100), being configured for creating an ion beam (1), in particular adapted for a neutral beam injection apparatus of a fusion plasma plant, comprises an ion source device (10) being arranged for creating ions, and a grid device (20) comprising at least two grids (21, 22) being arranged adjacent to the ion source device (10) and having a mutual grid distance d along a beam axis z, wherein the grids (21, 22) are electrically insulated relative to each other, the grids (21, 22) are arranged for applying different electrical potentials for creating an ion extraction and acceleration field (3) along the beam axis z, and the ion source device (10) and the grid device (20) are arranged in an evacuable ion beam space (Continued)

(30) extending along the beam axis z, wherein at least one of the grids is a movable grid (21), which can be shifted along the beam axis z, and the grid device (20) is coupled with a grid drive device (40) having a drive motor (41), which is arranged for moving the movable grid (21) along the beam axis z and setting the grid distance d between the movable grid (21) and another one of the grids (21, 22). Furthermore, applications of the ion beam extraction apparatus and a method of creating an ion beam along a beam axis z are disclosed.

16 Claims, 4 Drawing Sheets

(56) References Cited

U.S. PATENT DOCUMENTS

| | | | | |
|---|---|---|---|---|
| 2008/0142726 A1* | 6/2008 | Relleen | H01J 37/20 | 250/400 |
| 2010/0072402 A1* | 3/2010 | Satoh | H01J 27/024 | 250/492.21 |
| 2012/0312980 A1* | 12/2012 | Whitehouse | H01J 49/24 | 250/288 |
| 2020/0043775 A1* | 2/2020 | Savas | H01J 27/024 | |

FOREIGN PATENT DOCUMENTS

| | | | |
|---|---|---|---|
| EP | 1105908 A1 | | 6/2001 |
| JP | 2001107234 A | * | 4/2001 |
| WO | 9704474 A1 | | 2/1997 |
| WO | 0101438 A1 | | 1/2001 |

OTHER PUBLICATIONS

Duesing et al. (1987). Neutral beam injection system. Fusion Technology, 11(1), 163-202.
Staebler et al. (1995). Performance of the first ASDEX upgrade neutral beam injector. In Fusion Technology 1994 Proceedings vol. 1, 593-596.
Hanai et al. (2019). Characteristics of cesium-free negative hydrogen/deuterium ion source by sheet plasma. Fusion Engineering and Design, 146, 2721-2724.
Fantz et al. (2009). Physical performance analysis and progress of the development of the negative ion RF source for the ITER NBI system. Nuclear Fusion, 49(12), 125007.
Streibl et al. (2003). Chapter 2: Machine design, fueling, and heating in ASDEX Upgrade. Fusion science and technology, 44(3), 578-592.
International Search Report from corresponding PCT/EP2020/067321 mailed Mar. 1, 2021.

* cited by examiner

ION BEAM EXTRACTION APPARATUS AND METHOD FOR CREATING AN ION BEAM

CROSS-REFERENCE TO RELATED APPLICATIONS

This application is a U.S. National Phase Application of PCT/EP2020/067321, filed Jun. 22, 2020, the content of which is incorporated herein by reference in its entirety for all purposes.

FIELD OF THE INVENTION

The invention relates to an ion beam extraction apparatus and to a method for creating an ion beam, in particular using an ion source device and at least two grids for accelerating ions by electrical potentials along a beam axis, like e. g. an ion beam extraction apparatus employed as a neutral beam injection apparatus of a fusion plasma plant. Further applications of the invention are available in the fields of e. g. ion implantation, coating techniques and medical particle irradiation.

BACKGROUND OF THE INVENTION

In the present specification, reference is made to the following prior art illustrating the technical background of the invention, in particular relating to ion beam extraction in a neutral beam injection apparatus:

[1] B. Streibl et al. "MACHINE DESIGN, FUELING, AND HEATING IN ASDEX UPGRADE" in "Fus. Sci. Technol." 44 (2003) 578.

Neutral Beam Injection (NBI) is a well-established additional heating method for fusion plasmas, typically providing heating powers up to tens of megawatts to the plasma. In an NBI system ions, usually either positive or negative hydrogen ions, are generated in an ion source and extracted through a large grid with multiple apertures and a gross extraction area of several hundred to several thousand $cm^2$ by means of a voltage applied between this first grid, referred to as plasma grid, and a successive grid, the extraction grid. The extracted ions are either accelerated to the final beam energy in this single grid gap, or post-accelerated in successive acceleration stages by several more grids. The fully accelerated beam then passes through a neutraliser that converts a fraction of the ions into neutral particles. The neutral beam is transmitted to the fusion plasma in a toroidal confinement device through a duct.

NBI beamlines are usually quite long in order to host all aforementioned components; the beam-line for the fusion reactor ITER will measure about 26 m from source to plasma edge and that on the much smaller fusion experiment ASDEX Upgrade is about 7 m long. At the same time the beam duct is narrow, constrained by the toroidal field coils of the toroidal magnetic confinement device. Therefore the NBI beam has to have a low divergence in order to keep the transmission losses small.

The divergence of an ion beam, or more precisely, a beamlet extracted from a single aperture depends on the geometry of plasma and extraction grid, the voltage difference applied to these grids, called extraction voltage $V_{ex}$, and the extracted current, $I_{ex}$. The ratio $\Pi = I_{ex}/V_{ex}^{3/2}$ is called perveance. For a given grid geometry there exists an optimum perveance, $\Pi_{opt} = I_{opt}/V_{ex}^{3/2}$, for which the beamlet divergence is minimal.

The optimum perveance is approximately proportional to $(a/d)^2$, where a is the diameter of the plasma grid aperture and d is the extraction gap, i.e. the grid distance between the plasma grid and the extraction grid. For providing the optimum perveance, conventional NBI systems are configured with fixed design parameters, in particular with a fixed grid distance.

However, due to the requirement of operating NBI at optimum perveance, the power of the extracted ion beam has a strong dependence on the extraction voltage, $P_{ex} = I_{ex} V_{ex} = \Pi_{opt} V_{ex}^{5/2}$. Neglecting the energy dependence of the neutralisation yield, the neutral beam injected into the plasma inherits the same dependence of power on the extraction voltage.

Curve A of FIG. 4 illustrates the operational space of a conventional NBI system with a fixed grid distance, using ASDEX Upgrade's NBI injector 2 as an example. In its present form, the injector is designed to deliver 2.5 MW of neutral beam power per beam at an extraction voltage of 93 kV, i.e. 93 keV beam energy. When decreasing the beam energy at fixed grid distance and thus constant perveance, the power strongly decreases with it, as the thick black line of curve A indicates.

NBI systems are designed to deliver the desired power at a beam energy that is optimised for the parameters of the device that they are installed on when it operates at typical plasma parameters. However, parameter studies, advanced plasma control, or avoidance of beam shine through at low plasma density among other reasons require changing—i.e. in most cases reducing—the beam energy from its design value. As explained above, this leads to a strong reduction of the injected neutral beam power.

Thus, conventional ion beam extraction techniques have a substantial disadvantage in terms of limited degrees of freedom for adapting the ion beam extraction to particular application conditions. This disadvantage does not occur with NBI systems only, but also with other ion beam extraction systems, e. g. for implanting or coating applications.

OBJECTIVE OF THE INVENTION

The objective of the invention is to provide an improved ion beam extraction apparatus and an improved method for creating an ion beam, avoiding disadvantages of conventional techniques. In particular, ion beam extraction is to be provided with increased variability of setting parameters of ion beam extraction, reduced ion beam power dependency on extraction voltage and/or improved capability of creating the ion beam with minimum divergence.

SUMMARY OF THE INVENTION

The above objectives are solved by an ion beam extraction apparatus and a method for creating an ion beam of the invention.

According to a first general aspect of the invention, the above objective is solved by an ion beam extraction apparatus, being configured for creating an ion beam. The ion beam extraction apparatus comprises an ion source device being arranged for creating ions and a grid device comprising at least two grids being arranged adjacent to the ion source device and having a mutual grid distance along a beam axis (axial direction of the ion beam extraction apparatus). The grid distance is a length of a gap or spacing between the grids in a direction parallel to the beam axis. The grids are electrically insulated relative to each other. Furthermore, the grids are arranged for applying different electrical potentials for creating an ion extraction and acceleration field along the beam axis. The ion source device and the grid device are arranged in an evacuable ion beam space extending along the beam axis.

According to the invention, at least one of the grids is a movable grid, which can be shifted along the beam axis. The grid device is coupled with a grid drive device having a drive motor, which is arranged for moving the movable grid along the beam axis and setting the grid distance between the movable grid and another one, preferably the next neighbouring, of the grids.

According to a second general aspect of the invention, the above objective is solved by a method of creating an ion beam along a beam axis, comprising the step of creating ions with an ion source device and passing the ions through an ion extraction and acceleration field along the beam axis, wherein the ion extraction and acceleration field is created with a grid device comprising at least two grids being arranged adjacent to the ion source device and having a mutual grid distance along the beam axis. The ion source device and the grid device form an evacuated ion beam space extending along the beam axis.

According to the invention, the method of creating the ion beam includes a further step of adjusting the grid device by moving a movable grid of the at least two grids along the beam axis, wherein the grid distance is set by a drive motor of a grid drive device which is coupled with the grid device. Advantageously, the grid distance can be set such that the particle energy can be chosen independently from the particle current in a wide range at simultaneously minimum divergence. Preferably, the inventive method of creating the ion beam or one of the embodiments thereof is conducted with the ion beam extraction apparatus according to the first general aspect of the invention or one of the embodiments thereof.

The ion source device generally comprises an ion source wherein ions are created by collisions of neutral particles (e. g. atoms or molecules) with energetic electrons which are created either by an arc discharge or by coupling high frequency waves into it. In particular, the ion source device is an apparatus including a neutral particle supply and an energetic electron supply arranged for ionizing the neutral particles. The ion source device is configured for an operation at a high electrical potential, e. g. a potential of at least 1 kV up to 1 MeV. The grid device comprises two or more grids, each comprising a plane or curved electrode with apertures allowing a passage of ions. With the plane design, the electrodes are arranged parallel to each other and perpendicular to the beam axis, i. e. in radial directions relative to the beam axis. In case of the curved design, the grids are arranged with a constant mutual distance with the center of the curvature on the beam axis. Furthermore, the grids are arranged for applying electrical potentials (grid potentials) which create the electric ion extraction and acceleration field along the beam axis.

With preferred applications of the invention, e. g. in a neutral beam injection system, the grids comprise a plasma grid (also called first grid) arranged next to the ion source device and an extraction grid (also called second grid) arranged adjacent to the plasma grid. Optionally, at least one further post-accelerating grid can be provided downstream of the extraction grid.

The movable grid is one of the grids, which can be shifted relative to the remaining structure of the ion beam extraction apparatus along the beam axis. The movable grid can be shifted parallel to the beam axis while keeping the perpendicular orientation and the radial position relative to the beam axis. Advantageously, this can be achieved with high precision. In particular, the movable grid can be shifted with the grid drive device in the completely assembled and evacuated ion beam extraction apparatus, e. g. during the operation thereof. The grid drive device including the drive motor is configured for adjusting the movable grid at a predetermined position on the beam axis. According to the positions of the movable grid and the neighbouring grid, the grid distance therebetween is set. Preferably, one single grid of the group of grids is movable. Alternatively, two or more grids can be movable.

The inventors have found that the above disadvantages of conventional NBI systems can be avoided with the grid device in which the grid distance, in particular the extraction grid gap, can be varied in situ. Changing the grid distance allows optimizing perveance, making it possible to match the actual perveance ($\Pi_{opt}=\Pi$) for a wide range of combinations of extraction voltage $V_{ex}$ and extracted current $I_{ex}$. This means for example that the injected power can be kept roughly constant while changing the beam energy or vice versa the power can be changed at constant beam energy. Advantageously, the invention provides the variable grid gap so that the ion beam extraction can be provided with an extended operational space. Shifting the movable grid provides an additional degree of freedom in setting operation parameters of the ion beam extraction, in particular for shaping the ion beam and in particular minimizing the divergence of the ion beam.

Furthermore, the inventors have found that the movable grid can be implemented despite of the fact that the technical realization of an ion beam extraction apparatus, e. g. in an NBI system, is challenging. The whole process of ion formation, extraction and acceleration takes place in a high vacuum environment with a low impurity content. The ion source device and the grids, like the plasma grid and the extraction grid (and possible acceleration grids), are set on different, but high electric potentials of e. g. several 10 kV up to 1000 kV. Mechanical support and supplies (electric, cooling) are properly insulated against each other and against ground potential, and suitable vacuum feedthroughs are provided for all supplies. The grids are high precision components which preferably are provided with internal water cooling (to cope with the plasma heat load) and typically have a shape and position tolerance of a few hundredths of a millimeter for each of the single beamlet apertures (several hundred to several thousand apertures per grid, e.g. 774 for ASDEX Upgrade).

According to a preferred embodiment of the invention, the movable grid has a grid support frame, which is shiftable along linear guide carriers extending parallel to the beam axis and the drive device is coupled with the shiftable grid support frame. Advantageously, the grid support frame provides a stable carrier of the movable grid, so that the radial position and orientation can be precisely kept when adjusting the axial position thereof. The grid support frame is a solid frame component supporting the movable grid. At least two, preferably at least three linear guide carriers are provided in engagement with the grid support frame. By the action of the drive device on the grid support frame, the movable grid is shifted for setting the grid distance.

Particularly preferred, the drive device comprises the drive motor and at least one pair of a rotating spindle nut and a drive spindle, which is coupled with the shiftable grid support frame, and the spindle nut is rotatable by the drive motor. Shifting the movable grid by the action of at least one drive spindle has particular advantages in terms of precise adjustment of the axial position of the movable grid.

If, according to a further preferred variant, the drive device comprises multiple pairs of spindle nuts and drive spindles, which are coupled with the shiftable grid support frame at different edge sections thereof, keeping the perpendicular orientation of the movable grid relative to the beam axis is advantageously facilitated. Particularly preferred, the drive spindles comprise one primary drive spindle which is directly coupled with the drive motor and at least one secondary drive spindle which is coupled with the primary drive spindle via a chain or belt drive. With this embodiment, the coupling of the drive motor with the drive spindles is facilitated.

According to a further particularly preferred embodiment of the invention, the drive motor is a pressurized air motor. The pressurized air motor is mechanically connected to the shiftable grid support frame and thus being set on the high electrical potential of the movable grid. The activation of the pressurized air motor is realized via pressurized air through plastic hoses and thus provides electrical insulation between the movable grid and all other components of the system at ground potential, thus advantageously allowing an operation while a high voltage potential is applied to the movable grid.

According to a further preferred embodiment of the invention, the drive motor is arranged in a surrounding outside of the evacuable ion beam space, and the drive motor is coupled with the movable grid support frame using membrane bellows for vacuum sealing. This allows an advantageous configuration of the drive device for an operation at atmospheric pressure.

Preferably, a position measurement device is arranged for sensing a position of the movable grid. Particularly preferred, the position measurement device comprises a drive monitor coupled with the grid drive device and/or a position sensor coupled with the movable grid. Advantageously, the position measurement device allows a precise monitoring and/or adjustment of the grid distance.

In particular, according to a further advantageous variant of the invention, the position measurement device can be included in a control loop for controlling the grid distance. Preferably, the grid distance is set using a loop control in dependency on a power parameter of the extracted ion beam. With these embodiments, a grid position control unit is preferably provided, which is coupled with the grid drive device and the position measurement device and which is configured for the loop control for setting the grid distance.

If, according to a further embodiment of the invention, a mechanical stop arrangement, including at least one mechanical stop, is arranged for limiting a range of setting the grid distance, advantages in terms of operation safety of the ion beam extraction apparatus are obtained.

According to a further preferred feature of the invention, a cooling device with cooling medium supply lines can be arranged for cooling the grid device. The cooling medium supply lines coupled with the movable grid are routed out of the evacuated space by sliding pipes, which are vacuum sealed by membrane bellows. Advantageously, the sliding pipes facilitate keeping the cooling action during the operation of the ion beam extraction apparatus, in particular during adjusting the grid distance.

While the movable grid may be any one of the grids, according to a particularly preferred embodiment, the movable grid is arranged directly adjacent to the ion source device. Accordingly, the movable grid is the first grid passed by the ions extracted from the ion source device. This embodiment has, compared with shifting e. g. the second grid, advantages for the mechanical set-up and avoiding unintended changes of relative distances of subsequent grids.

According to a preferred application of the invention, the ion beam extraction apparatus is configured as a neutral beam injection apparatus of a fusion plasma plant. Preferably, the ion source device is a plasma source with an ion exit window, the at least two grids comprise a plasma grid being arranged at the ion exit window of the plasma source and an extraction grid being coupled with a high voltage power source, and preferably a neutraliser device is arranged downstream of the extraction grid for converting at least a portion of the accelerated ions into neutral particles. With this application in the NBI apparatus, particular advantages for creating the ion beam with minimum divergence and precise passing the ion beam through a duct port into the torus shaped reactor vessel of the fusion plasma plant are obtained.

According to further preferred applications of the invention, the ion beam extraction apparatus is an ion generator of an ion implantation plant, an ion generator of a coating plant, an ion generator of a medical application, or an ion thruster.

BRIEF DESCRIPTION OF THE DRAWINGS

Further details and advantages of the invention are described with reference to the attached drawings, which show in FIG. 1: a schematic illustration of features of preferred embodiments of an ion beam extraction apparatus and method according to the invention.

DESCRIPTION OF PREFERRED EMBODIMENTS

Preferred embodiments of the invention are described in the following with exemplary reference to an ion beam extraction apparatus included in an NBI system. It is emphasized that the invention is not restricted to this application, but rather possible in a corresponding manner e. g. for providing an ion generator of an ion implantation plant, a coating plant, a medical application, or an ion thruster. The NBI system is described with particular reference to the details of adjusting the movable grid of the grid device. Further details of the NBI system components, like e. g. details of the plasma source, the grid design, the grid support, the electric insulation, the vacuum equipment, the cooling device, the neutraliser, and the operation of the NBI system are not described as far as they are known from conventional NBI systems, like the ASDEX Upgrade NBI injector [1]. The figures are schematic illustrations. In practice, the shape and size of the illustrated components can be selected and adapted in dependency on particular application requirements.

Figure 1:
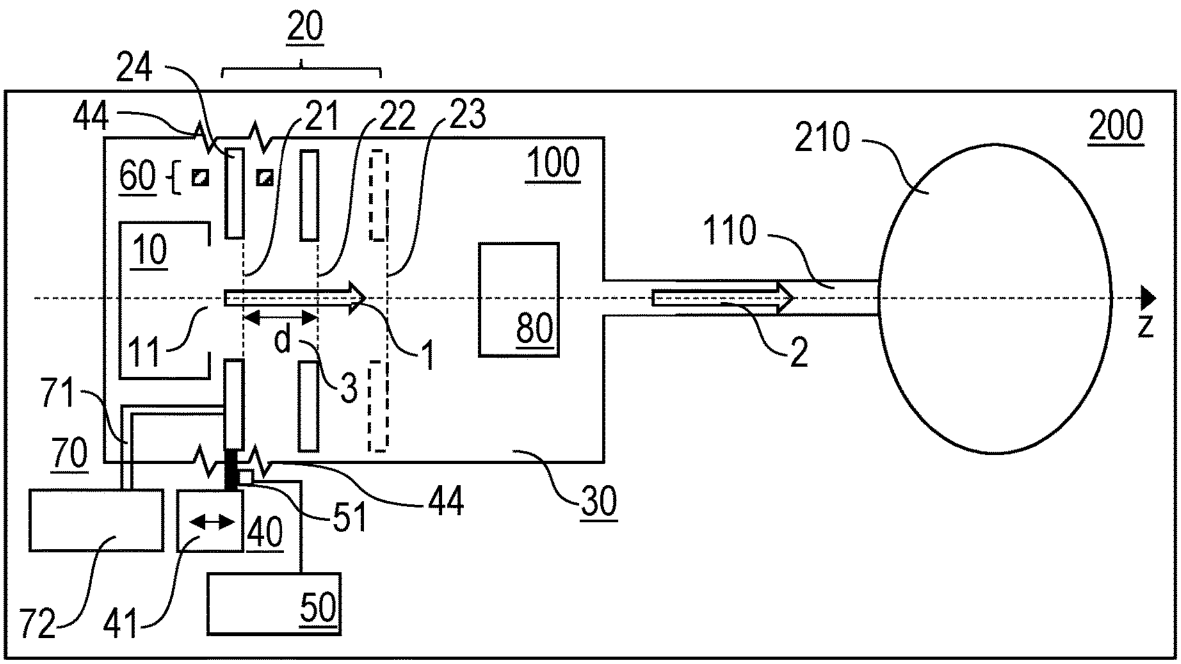
Figure 2:
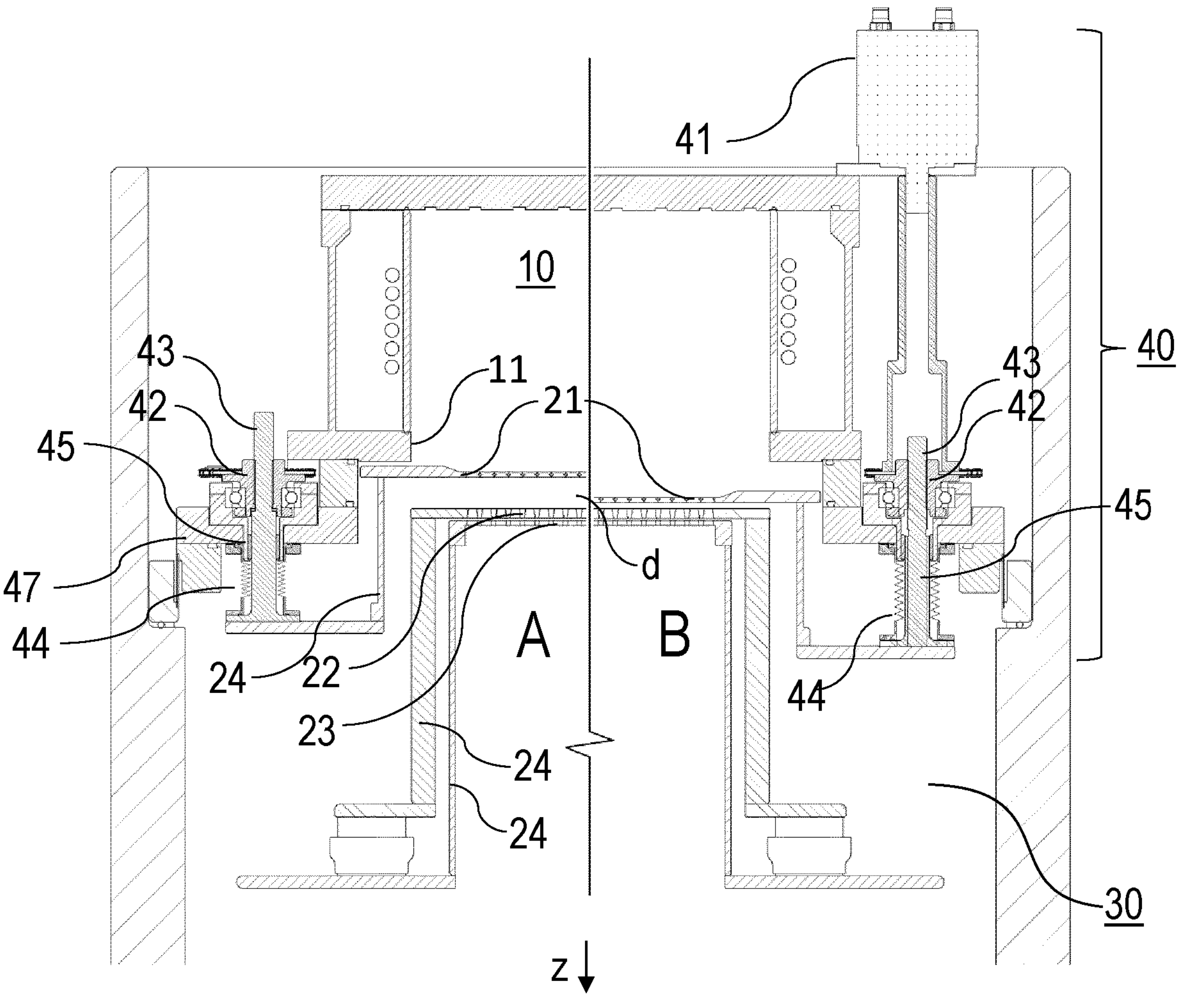
FIG. 2: a schematic cross-sectional partial illustration of an embodiment of the ion beam extraction apparatus adapted for an NBI system.

FIG. 1 schematically shows an embodiment of the ion beam extraction apparatus 100 configured as the NBI system of a fusion plasma plant 200. Further details of the ion beam extraction apparatus 100 are illustrated in FIG. 2. The ion beam extraction apparatus 100 creates an ion beam 1, which is converted into a neutral particle beam 2 to be directed through a port duct 110 into the torus shaped reaction chamber 210 of the fusion plasma plant 200. The ion beam extraction apparatus 100 comprises the ion source device 10, the grid device 20 with three grids 21, 22 and 23, each with a grid support frame 24, the grid drive device 40 with a drive device 41, the grid position control unit 50, the mechanical stop arrangement 60 and the cooling device 70 with the cooling lines 71. The grids 21, 22 and 23 are arranged for extracting the ion beam 1 from the ion source device 10 along a beam axis z.

An evacuable ion beam space 30 is provided, including a vacuum recipient, which accommodates the components 10, 20, 40, 50, 60 and 70 at least partially in high vacuum. Additionally, a neutraliser device 80 is arranged in the evacuable ion beam space 30. The neutraliser device 80 is configured for converting a substantial fraction (about 30 to 70%, depending on beam energy) of the ion beam 1 of fast ions into a neutral particle beam 2 of fast neutral particles through interaction with neutral background gas. The residual ions at the end of the neutraliser device 80 are separated from the neutral particle beam 2 by a magnetic or electrostatic deflector onto an ion dump (not shown).

The ion source device 10 is a plasma source for creating ions from hydrogen atoms. The ions are extracted from the plasma source through an ion exit window 11, which is the open side of the plasma source (see also FIG. 2) by the effect of an electric field between the first grid 21 and the second grid 22 penetrating through the apertures of the first grid 21 into the plasma source.

The first grid 21 of the grid device 20, downstream from the ion exit window 11, is the plasma grid, which is movable as described below and therefore called the movable grid. Subsequently, the extraction grid 22 and a further acceleration grid 23 (grounded grid) are provided as the second and third grids. The extraction grid 22 and the further acceleration grid 23 remain unchanged and they are kept in a fixed position relative to the ion source device 10, in particular with respect to a high voltage flange 47. Each grid is mounted onto a grid support frame 24. The grid support frames 24 of the grids 21, 22 and 23 basically have the same structure. Each of the grids 21, 22 and 23 comprises two individual segments (see e.g. segments 21A, 21B in top view of the plasma grid 21 in FIG. 3) which are mounted onto the grid support frame 24 (see FIG. 2). The grid support frames 24 of the grids 21, 22 and 23 are nested inside each other and mounted on ceramic posts that provide the electrical insulation. Each of the grids 21, 22 and 23 extends in a plane perpendicular to the beam axis z. The grids have e. g. 774 apertures with a diameter of 8 mm. The apertures of the different grids 21, 22 and 23 are aligned relative to each other.

The cooling device 70 comprises cooling medium supply lines 71 (cooling water supply lines, schematically shown in FIG. 1), which are coupled with the grid support frames 24, with the grids 21, 22, 23 and with a cooling medium supply 72, e. g. as it is known from standard ASDEX Upgrade ion sources. In case of the movable grid 21, the cooling medium supply lines 71 include sliding pipes, which are vacuum sealed by bellows. On the air side, the motion of the movable grid 21 is compensated by flexible metal hoses, which again are connected to the cooling supply lines 71 via insulating hoses.

The grid drive device 40 is coupled with the movable plasma grid 21 for setting the grid distance d. Changing the gap between plasma grid 21 and the extraction grid 22 in situ comprises in the illustrated example moving the plasma grid 21 along the beam axis z in the order of tens of millimeters, e. g. in a range from 5 mm to 25 mm. The movement advantageously is conducted while keeping the vacuum, with flexible supply connections, electrically insulated for high potentials and with a very high precision (parallel to the beam direction of the order of 0.1 mm). Furthermore, the mutual lateral alignment of the apertures of the different grids 21, 22 and 23 is kept during the movement at even higher precision in the order of several hundreds of millimeters. As the drive motor 41 of the grid drive device 40 is arranged outside the evacuable ion beam space 30, membrane bellows 44 are provided for keeping the vacuum and compensating of movements of further parts of the grid drive device 40. Details of the grid drive device 40 using rotating spindle nuts on the drive spindles 43 are described below with reference to FIGS. 2 and 3.

Setting the grid distance d is preferably obtained with a control loop implemented with the grid position control unit 50, which is coupled with the grid drive device 40 and a position measurement device 51. The grid position control unit 50 is a computer device being coupled with a general control of the ion beam extraction apparatus 100 and/or the fusion plasma plant 200, e. g. in a remote control room. The position measurement is preferably done on the air side via redundant measurement of the drive spindle rotation and a linear measurement, both transmitted via light fibers from the high potential to the grid position control unit 50. The position measurement device 51 is e. g. a drive monitor coupled with the grid drive device 40 for sensing a current adjustment position of the movable grid 21, e. g. by counting rotations of the drive spindles. The mechanical stop arrangement 60 comprises two mechanical stops which are implemented to prevent damage should one of the position measurement device 51 and the grid position control unit 50 fail.

Changing and adjusting the grid distance to a particular predetermined value is conducted in dependency on the particular application conditions of the NBI system, in particular for optimizing perveance in relation to a certain extraction voltage $V_{ex}$ and extracted ion current $I_{ex}$. The grid distance to be set is obtained from numerical calculations and/or calibration data of the NBI system.

FIG. 2 is a cross sectional view of a portion of the ion beam extraction apparatus 100 including the grid drive device 40 with further details, wherein two different positions of the movable grid 21 with a largest grid distance d (FIG. 2A) and a smallest grid distance d (FIG. 2B) relative to the extraction grid 22 are shown. In the upper section of FIG. 2, the ion source device 10 with the ion exit window 11 is illustrated. The beam axis z is vertically oriented in the drawing plane. The extraction grid 22 and the further acceleration grid 23 are shown downstream of the movable grid 21.

The grid support frame 24 of the movable grid 21 is supported in vacuum in the ion beam space 30 by drive spindles 43. Four fine threaded drive spindles 43A, 43B are provided as further shown in the top view of FIG. 3. Thus, the grid support frame 24 of the movable grid 21 is supported via the spindles 43 with high accuracy. Support shafts 45 of the spindles 43 to the plasma grid support frame 24 act with guide bushings as high precision linear guides. The spindles 43 and their linear guides are positioned in air for better access and lubrication. The membrane bellows 44 enclosing the support shafts 45 serve as vacuum sealing. The drive motor 41 rotates the spindle nut 42 which is supported via ball bearings on the ion source base flange. This rotation of the nut moves the spindle and therefore movable grid 21.

Figure 3:
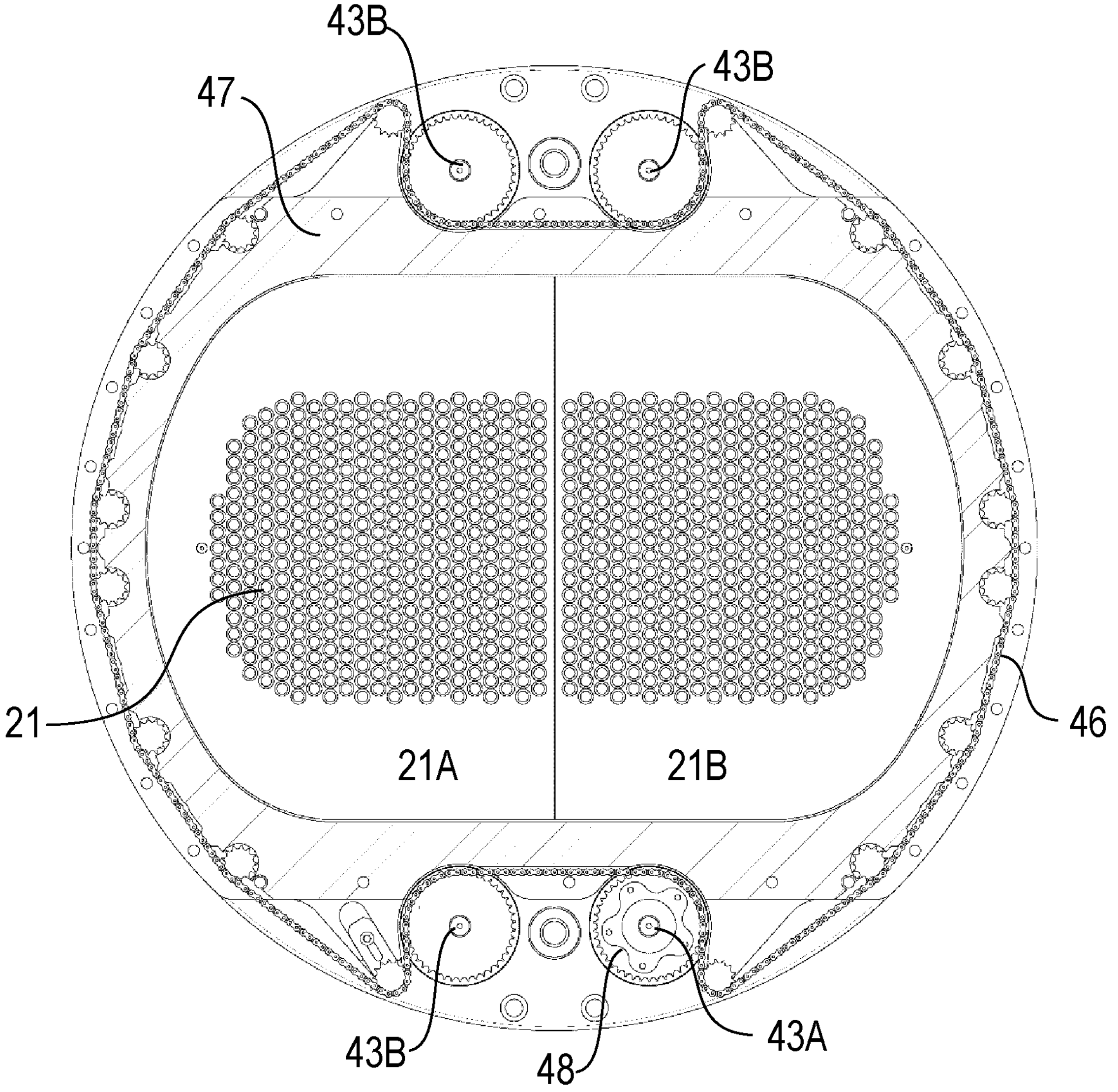
FIG. 3: a top view on a high voltage flange and a grid.

In order to improve synchronous rotation of all four spindles 43A, 43B, they are coupled outside the vacuum by a chain drive 46 on a high voltage flange 47 (see FIG. 3). One of the gearwheels 48 of the chain drive 46 is driven by the drive motor 41 of the grid drive device 40. The drive motor 41 is a pressurized air motor facilitating operation when the ion source device 10 is at high voltage. By this mechanism the gap d between extraction grid 22 and the plasma grid 21 can be adjusted, e. g. in the range from 5 mm to 25 mm.

Figure 4:
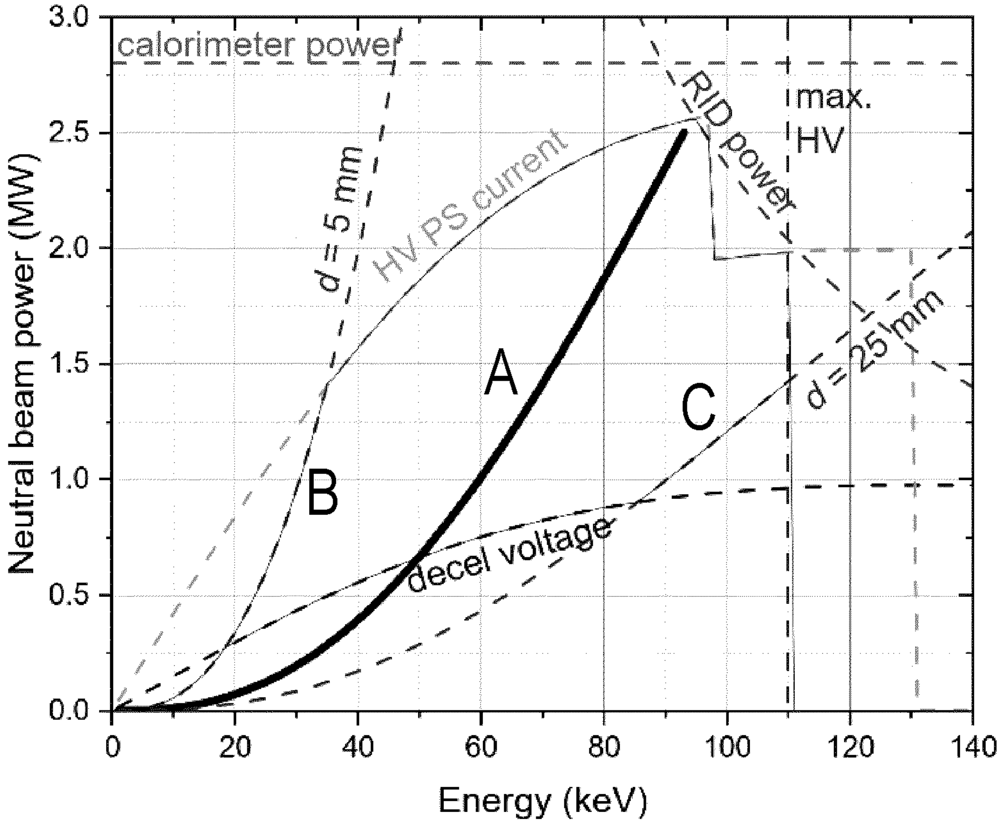
FIG. 4: a diagram illustrating an operational space of the ASDEX Upgrade NBI injector in the beam-energy-vs.-neutral-beam-power plane.

As mentioned above, FIG. 4 shows the operational space of the ASDEX Upgrade NBI injector in the beam-energy-vs.-neutral-beam-power plane. With the variable grid distance d, operation is no longer restricted to the black line of curve A, but to a continuous area between the dashed lines B and C. The boundaries of the area between the dashed lines B and C are given by the optimum perveances at minimum and maximum gap d (5 and 25 mm in the example), and further the maximum current that the high voltage power supply (HV PS) can deliver, the maximum power that the residual ion dump can take, and other system specific limitations represented by the further dashed lines in FIG. 4.

The features of the invention disclosed in the above description, the drawings and the claims can be of significance individually, in combination or sub-combination for the implementation of the invention in its different embodiments.

The invention claimed is:

1. An ion beam extraction apparatus, being configured for creating an ion beam, comprising
- an ion source device being arranged for creating ions, and
- a grid device comprising at least two grids including:
  - a plasma grid arranged next to the ion source device and being the first grid passed by the ions created by the ion source device, and
  - an extraction grid arranged adjacent to the plasma grid,
- said at least two grids being arranged adjacent to the ion source device and having a mutual grid distance along a beam axis, wherein
- the grids are electrically insulated relative to each other,
- the grids are arranged for applying different electrical potentials for creating an ion extraction and acceleration field along the beam axis, and
- the ion source device and the grid device are arranged in an evacuable ion beam space extending along the beam axis, wherein
- the plasma grid is a movable grid, which can be shifted along the beam axis,
- the extraction grid has a fixed distance from the ion source device,
- the grid device is coupled with a grid drive device, and
- the grid drive device comprises a drive motor, which is arranged for moving the plasma grid along the beam axis and setting the mutual grid distance between the plasma grid and the extraction grid, and
- a cooling device with cooling medium supply lines coupled to the grids and arranged for cooling the grid device.

2. The ion beam extraction apparatus according to claim 1, wherein
- the plasma grid has a grid support frame, which is shiftable along linear guide carriers extending parallel to the beam axis, and
- the drive motor is coupled with the shiftable grid support frame.

3. The ion beam extraction apparatus according to claim 2, wherein
- the grid drive device comprises at least one pair of a rotating spindle nut and a drive spindle, which is coupled with the shiftable grid support frame, and
- the spindle nut is rotatable by the drive motor.

4. The ion beam extraction apparatus according to claim 3, wherein
- the grid drive device comprises multiple pairs of spindle nuts and drive spindles, which are coupled with the shiftable grid support frame at different edge sections thereof.

5. The ion beam extraction apparatus according to claim 4, wherein
- the drive spindles comprise one primary drive spindle which is directly coupled with the drive motor and at least one secondary drive spindle which is coupled with the primary drive spindle via a chain or belt drive.

6. The ion beam extraction apparatus according to claim 3, wherein
- the drive motor is a pressurized air motor.

7. The ion beam extraction apparatus according to claim 1, wherein
- the drive motor is arranged in a surrounding outside of the evacuable ion beam space, and
- the drive device is coupled with the plasma grid using membrane bellows for vacuum sealing.

8. The ion beam extraction apparatus according to claim 1, further comprising
- a position measurement device being arranged for sensing a position of the plasma grid.

9. The ion beam extraction apparatus according to claim 8, wherein
- the position measurement device comprises at least one of a drive monitor coupled with the grid drive device and a position sensor coupled with the plasma grid.

10. The ion beam extraction apparatus according to claim 8, further comprising
- a grid position control unit being coupled with the grid drive device and the position measurement device and being configured for a loop control of setting the grid distance.

11. The ion beam extraction apparatus according to claim 1, further comprising
- a mechanical stop arrangement being arranged for limiting a range of setting the grid distance.

12. The ion beam extraction apparatus according to claim 1, wherein
- the ion beam extraction apparatus is configured as a neutral beam injection apparatus of a fusion plasma plant, wherein
- the ion source device is a plasma source with an ion exit window, and
- the plasma grid is arranged at the ion exit window of the plasma source and the extraction grid is coupled with a high voltage power supply.

13. The ion beam extraction apparatus according to claim 1, which is configured for use as
- a neutral beam injection apparatus of a fusion plasma plant,
- an ion generator of an ion implantation plant,
- an ion generator of a coating plant,
- an ion generator of a medical application, or
- an ion thruster.

14. A method of creating an ion beam along a beam axis, wherein an ion beam extraction apparatus according to claim 1 is used, comprising creating ions with the ion source device, and passing the ions through the ion extraction and acceleration field along the beam axis, wherein the ion extraction and acceleration field is created with the grid device comprising the plasma grid and the extraction grid, wherein the ion source device and the grid device are arranged in the evacuated ion beam space extending along the beam axis, wherein the grid device is adjusted by moving the plasma grid along the beam axis, wherein the grid distance is set by the grid drive device which is coupled with the grid device.

15. The method according to claim 14, wherein the grid distance is set such that particle energy can be chosen independently from particle current at simultaneously minimum divergence.

16. The method according to claim 14, wherein the grid distance is set using a loop control in dependency on a power parameter of the extracted ion beam.

* * * * *